United States Patent Office 3,143,439
Patented Aug. 4, 1964

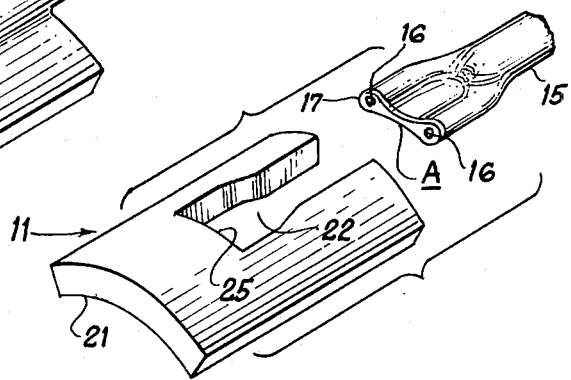
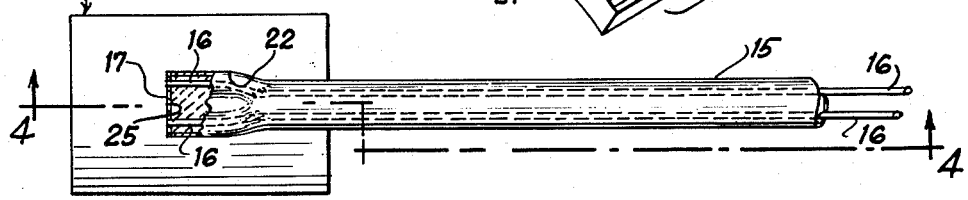
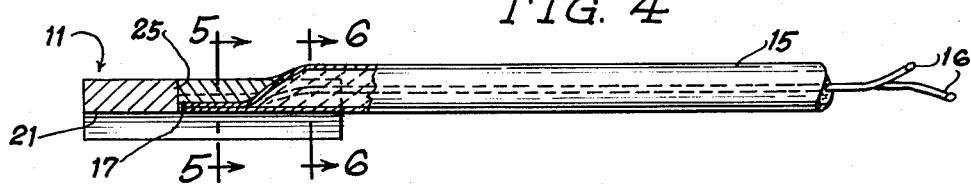
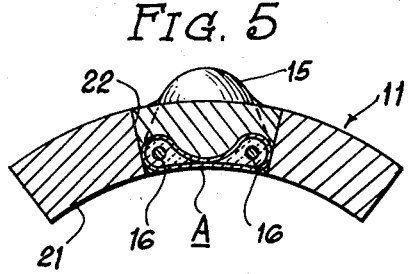
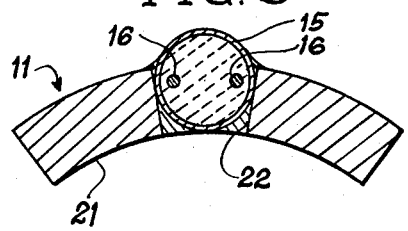
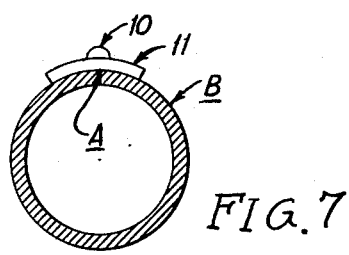

3,143,439
SURFACE THERMOCOUPLE ASSEMBLY
Peter F. Hansen, Niles, Ill., assignor, by mesne assignments, to American Radiator & Standard Sanitary Corporation, New York, N.Y., a corporation of Delaware
Filed Oct. 11, 1961, Ser. No. 144,349
6 Claims. (Cl. 136—4)

This invention relates to thermocouples for measurement of surface temperatures, sometimes called surface thermocouples. In particular it has reference to a construction for the sensing end of the thermocouple whereby adequate and efficient response thereof to the surface temperature may be realized.

The principal object of the invention is to provide, at the tip, i.e. sensing end of a surface thermocouple a relatively extended pad to be juxtaposed to the surface whose temperature is to be sensed, which pad is conformed congruently with the surface and which is integrated with the thermocouple in a manner such that error due to negative temperature gradient through the pad and the joint between the pad and the sheath of the thermocouple is virtually eliminated.

Another object is to provide a surface thermocouple enclosed in a protective and supporting sheath, and means for permanently securing the same to a surface whose temperature is to be sensed in such manner that gases of combustion or other hot media are effectively prohibited from direct contact with the working end of the thermocouple whereby improper response is substantially precluded.

A further object is to provide a thermocouple and integral pad as aforesaid which is particularly adapted to that form of thermocouple which comprises a tubular sheath enclosing the thermocouple wires, and in which the required spacing and support of the wires is obtained through the medium of refractory pellets or by the use of a compacted, refractory, pulverulent material, or other electrically insulating material.

Another object is to provide a thermocouple and integral pad as aforesaid which may be readily adapted to surfaces which are flat or curved convexly or concavely with no alteration in the principles of the invention or sacrifice of its improved function.

A further object is to provide a thermocouple and integrated pad in accordance with the foregoing which is ideally adapted to union of these two parts by welding.

Other objects and advantages will become apparent from the ensuing description which, taken with the accompanying drawing, discloses preferred modes of carrying the invention into practice.

In this drawing:

FIG. 1 is a perspective view to show the tip end of a thermocouple and the pad as assembled;

FIG. 2 is an exploded view similar to FIG. 1;

FIG. 3 is a top plan view of the assembly of FIG. 1;

FIG. 4 is a combined side elevation and cross section taken on the line 4—4 of FIG. 3.

FIG. 5 is a cross section on the line 5—5 of FIG. 4;

FIG. 6 is a cross section on the line 6—6 of FIG. 4; and

FIG. 7 is an end elevational view showing the relation of the combined pad and thermocouple to a typical surface with which it may be associated.

Turning to the drawing there is shown a surface thermocouple according to the invention comprising the thermocouple proper 10 and the thereto-secured pad 11. For convenience the thermocouple has been shown broken away since the length thereof and the connecting device constituting its opposite end are not material to the present specification.

The thermocouple is of a common type comprising a malleable, tubular, metallic sheath 15 of cylindrical form housing a pair of thermocouple wires 16—16 which, when joined at one end either commonly or by means of a bridging plate, constitute the thermoelectric junction, as will be understood. When the wires are joined directly the junction may be formed by twisting or welding; the same may be held in intimate contact with sufficient pressure through the use of a wedge or its equivalent interposed between the wires and the sheath, or by a plate bridging the wires. The principles of the invention are capable of embodiment with any of these named forms of junction or others not stated. As will appear, there is shown, by way of example, a junction formed by a bridging plate. In order to preserve electrical separation of the wires and to support the same in insulated relation with the sheath a suitable refractory filler or core is provided. This latter comprises pellets of ceramic material having bores to receive the wires, upon which they are strung, or the space may be filled with a powdered material such as magnesium oxide which is compacted into a dense matrix by vibration.

Prior to assembly with the pad 11 the end of the thermocouple sheath and its contained refractory material are deformed for a short distance to provide an extended area of contact A with the surface B to which the thermocouple will be secured, e.g. a boiler tube. In the example such surface B is assumed to be convex and, therefore, the homologous surface A of the sheath is provided with the same radius. Obviously in the case of a flat or concave companion surface the surface A will be respectively flat or convex. Desirably the outer wall section of the sheath opposite the surface A is deformed to tangency with the inner wall section (FIG. 5) in order to insure that, to the maximum possible extent, the whole perimeter of the sheath will tend to assume the same temperature whereby sensing error may be reduced. However, it is within contemplation that the peripheral configuration of the deformed portion of the sheath may be a flat oval or other shape so long as the surface A is conformed to the surface of which the temperature is to be read.

It will be apparent that deformation of the sheath of the thermocouple in the manner just described will crush and re-distribute the refractory material correspondingly. However, since such material is quite dense and fills all of the voids its spacing, supporting and insulating functions remain unaffected. Following deformation the end of the sheath is trimmed true and square and a bridging plate 17 is positioned thereacross and welded to the sheath to close the same and to unite the wires to complete the thermoelectric junction. In practice the plate 17 is bored to pass the wires 16—16 which are then upset by peening or are welded in place to improve the junction. It will be apparent that, to achieve this end, the wires are allowed to protrude from the refractory matrix and may therefore be threaded through the corresponding apertures in the plate 17, whereafter they may be trimmed as appropriate to the upsetting or welding step. Desirably the apertures in the plate 17 are slightly countersunk to receive the weld or upset ends of the wires, following which these latter are desirably ground flush with the surface of the plate for optimum contact with the aperture in the pad now to be detailed.

The pad 11 is of metal having suitable heat-conductive characteristics and capable of being welded into place on the surface to be sensed since, in many cases, such mode of attachment is preferred. Its thickness is desirably a minimum consistent with mechanical strength but adequate for the union therewith of the thermocouple tip in a manner to be described. For best results it has been found that the material of the pad should correspond to the material of the sheath. As alluded to heretofore the pad is conformed, at least on its contacting face 21, to provide optimum transmission of heat therethrough from the surface B to which the pad is attached. At one end of the pad there is provided a recess 22 preferably in the form of a notch therethrough (FIG. 2), and having a marginal contour within which the deformed end portion of the sheath 15 may be snugly received, and as will be clear from the drawing. Such notch may be punched or otherwise formed prior to any required bending of the pad, in which case the lateral walls of the notch will assume a diverging relation (FIG. 5) or the notch may be cut subsequent to forming with parallel sides. In either case the relative disposition of the lateral walls is immaterial in view of the means employed to unite the pad and sheath. Such means involves intimate union by welding. For example, all of the voids between the sheath and pad may be completely filled by welding material whereafter the surfaces A and 21 may be ground flush, or only the voids between these surfaces on the underside may be filled and ground flush. However, the first alternative is preferred in order to achieve the best possible heat-transferring relation between the surface to be sensed and the thermocouple junction. It will be noted that the flat surface of the plate 17 is abutted against the end wall 25 of the notch 22 whereby additional efficiency of response is realized.

As an alternative the end of the sheath may be deformed in one of the ways heretofore described and the pad may be cast integrally therearound. This mode of assembly is well-adapted to applications where the pad is to be employed against a surface having an irregular contour and the investment in forming dies is contraindicated. In fact one of the outstanding advantages of the invention is the ease with which the thermocouple may be combined with a pad of virtually any contour on its contacting surface. Stated otherwise, the end of the sheath may be of a selected standard form and the complementary notch provided in a pad having any desired special configuration.

While I have shown particular embodiments of my invention, it will be understood, of course, that I do not wish to be limited thereto since many modifications may be made and I, therefore, contemplate by the appended claims to cover any such modifications as fall within the true spirit and scope of my invention.

I claim:

1. A surface thermocouple assembly adapted to be secured to a surface whose temperature is to be sensed comprising: a thermocouple element having a tubular metallic sheath, a plurality of wires contained in said sheath together with electrically-insulating material to space and support said wires, said wires being joined at one end to constitute a thermoelectric junction adjacent one end of said sheath, and a metallic pad having a face conformed for contiguous relation with the surface to be sensed and a notch in one edge to receive said one end of the sheath with the said junction lying within the confines of the pad, said sheath being essentially flattened on one side to present a flush relation with said pad face and an extended area of said sheath contiguous to said surface, and material intermediate said notch and sheath end portion uniting said end and pad in heat-conducting relation.

2. The combination in accordance with claim 1 further characterized in that said end of said sheath is provided with a closure plate abutting a congruently contoured lateral wall surface of said notch.

3. The combination in accordance with claim 1 further characterized in that the wall of the sheath opposite said conformed sheath surface portion is, in part, substantially tangent to said extended area of said sheath in a region intermediate said wires.

4. The combination in accordance with claim 1 further characterized in that said end of said sheath is provided with a closure plate bridging said wires and attached thereto to constitute the junction of said wires.

5. A surface thermocouple assembly adapted to be secured to a surface whose temperature is to be sensed comprising: a thermocouple element having a tubular metallic sheath, a plurality of wires contained in said sheath together with electrically-insulating material to space and support said wires, said wires being joined at one end to constitute a thermoelectric junction adjacent one end of said sheath, a sheet-like, metallic pad having a face conformed for contiguous relation with the surface to be sensed, the diameter of said sheath being greater than the thickness of said pad, said end of said sheath being reduced to substantially elongate oval cross section for a portion of its length at said one end thereof, one longer face of said cross section being substantially flush with one side of said sheath, said pad having a notch conformed to the boundary of said sheath end portion, the thickness of said cross section being substantially equal to the thickness of the pad to be positioned within the notch, the said flush side of said sheath end portion being flush with the said face of said pad, and material intermediate said notch and sheath end portion uniting said end and pad in heat conducting relation.

6. A surface thermocouple assembly adapted to be secured to a surface whose temperature is to be sensed comprising: a thermocouple element having a tubular metallic sheath, a plurality of wires contained in said sheath together with electrically-insulating material to space and support said wires, said wires being joined at one end to constitute a thermoelectric junction adjacent one end of said sheath, said one end of said sheath over a portion of its length substantially coextensive with said junction having a face conformed to the surface to be sensed, a metallic pad having a face conformed to said surface, said pad having an aperture open on one edge thereof and open on the face thereof contiguous to said surface to receive said one end of said sheath, the lateral wall of said aperture being homologous with the lateral boundary of said conformed face of said sheath, said conformed pad and sheath faces being in flush relation, and heat-conducting material intermediate said notch and sheath end portion uniting said end and pad in heat-conducting relation.

References Cited in the file of this patent

UNITED STATES PATENTS

| | | |
|---|---|---|
| 1,140,701 | Mitchell | May 25, 1915 |
| 1,907,540 | Hebler | May 9, 1933 |
| 2,921,972 | Kreisler | Jan. 19, 1950 |
| 2,607,808 | Kehoe | Aug. 19, 1952 |
| 2,779,810 | Horbinski | Jan. 29, 1957 |